United States Patent
Stavroff et al.

(10) Patent No.: US 7,477,972 B2
(45) Date of Patent: Jan. 13, 2009

(54) ROLLOVER WARNING AND DETECTION METHOD FOR TRANSPORT VEHICLES

(75) Inventors: Brian M. Stavroff, Galveston, IN (US); Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 480 days.

(21) Appl. No.: 11/194,152

(22) Filed: Aug. 1, 2005

(65) Prior Publication Data

US 2007/0027596 A1    Feb. 1, 2007

(51) Int. Cl.
G60G 17/016 (2006.01)
G60G 23/00 (2006.01)

(52) U.S. Cl. .................... 701/38; 701/70; 701/110; 280/5.502; 340/439

(58) Field of Classification Search ............... 701/29, 701/38, 70, 82, 110, 124; 280/5.502; 340/438, 340/439, 441
See application file for complete search history.

(56) References Cited

U.S. PATENT DOCUMENTS

| | | | |
|---|---|---|---|
| 6,002,974 | A | 12/1999 | Schiffmann |
| 6,002,975 | A | 12/1999 | Schiffmann et al. |
| 6,130,608 | A | 10/2000 | McKeown et al. |
| 6,192,305 | B1 | 2/2001 | Schiffmann |
| 6,542,792 | B2 | 4/2003 | Schubert et al. |
| 6,584,388 | B2 | 6/2003 | Schubert et al. |
| 6,678,631 | B2 | 1/2004 | Schiffmann |
| 6,714,848 | B2 | 3/2004 | Schubert et al. |
| 2004/0133338 | A1 | 7/2004 | Verhagen et al. |
| 2005/0060069 | A1* | 3/2005 | Breed et al. ............ 701/29 |
| 2005/0087389 | A1 | 4/2005 | Turner et al. |
| 2006/0259225 | A1* | 11/2006 | Ono et al. ............ 701/82 |

FOREIGN PATENT DOCUMENTS

| | | |
|---|---|---|
| JP | 04 128521 | 4/1992 |
| JP | 06 297985 | 10/1994 |
| JP | 2001 260782 | 9/2001 |
| WO | 98/25779 | 6/1998 |
| WO | 03/079308 | 9/2003 |

OTHER PUBLICATIONS

European Search Report dated Nov. 27, 2006.

* cited by examiner

*Primary Examiner*—Gertrude Arthur Jeanglaud
(74) *Attorney, Agent, or Firm*—Douglas D. Fekete

(57) ABSTRACT

A rollover warning and detection method for a transport vehicle is adaptively adjustable to take into account the CG height of the vehicle. Measures of the vehicle speed, lateral acceleration and yaw rate are sampled during normal driving conditions and used to estimate the CG height of the vehicle. The centrifugal acceleration acting on the vehicle is calculated as the product of vehicle speed and yaw rate, and the CG height is estimated based on the relationship between the calculated centrifugal acceleration and the measured lateral acceleration. The estimated CG height of the vehicle is used to adjust various calibrated rollover detection thresholds so that algorithm outputs such as rollover warnings automatically take into consideration vehicle loading effects.

9 Claims, 4 Drawing Sheets

ROLLOVER WARNING AND DETECTION METHOD FOR TRANSPORT VEHICLES

TECHNICAL FIELD

The present invention relates to vehicle rollover sensing, and more particularly to a rollover early warning and detection method for transport vehicles such as heavy duty trucks.

BACKGROUND OF THE INVENTION

Various rollover warning and detection systems have been developed for the heavy duty truck market. These systems can warn the driver when the risk of rollover is considered to be high and/or intervene (by braking, for example) to reduce the likelihood of rollover. The measurable vehicle parameters relevant to rollover include the steering wheel angle and the vehicle's roll angle, lateral acceleration, yaw rate and speed. In the U.S. Pat. No. 6,542,792 to Schubert et al., for example, an impending rollover is detected by comparing the roll rate vs. roll angle operating point of the vehicle to a calibrated threshold. However, the rollover susceptibility of a transport vehicle varies dramatically with the placement, distribution and weight of its cargo load because these factors alter the vehicle's center-of-gravity (CG). For example, a semi trailer with a full load of cotton candy will have a lower weight but a higher CG than a flatbed trailer loaded with a single slab of pig iron. Accordingly, what is needed is a rollover warning and detection method for a transport vehicle that adapts to different load conditions.

SUMMARY OF THE INVENTION

The present invention provides an improved transport vehicle rollover warning and detection method that is adaptively adjustable to take into account the CG height of the vehicle. Measures of the vehicle speed, lateral acceleration and yaw or steering rate are sampled during normal driving conditions and used to estimate the CG height of the vehicle. The centrifugal acceleration acting on the vehicle is calculated as the product of vehicle speed and yaw or steering rate, and the CG height is estimated based on the relationship between the calculated centrifugal acceleration and the measured lateral acceleration. The estimated CG height of the vehicle is used to adjust various calibrated rollover detection thresholds so that algorithm outputs such as rollover warnings automatically take into consideration vehicle loading effects.

DESCRIPTION OF THE PREFERRED EMBODIMENT

Figure 1A:
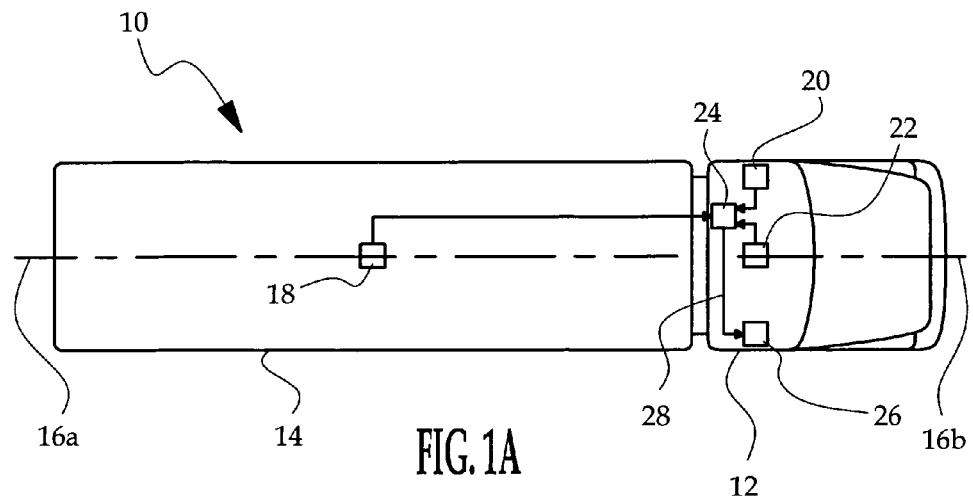
FIG. 1A is a diagram of a heavy duty truck equipped with various sensors and a microprocessor-based controller for carrying out the method of the present invention.
Figure 1B:
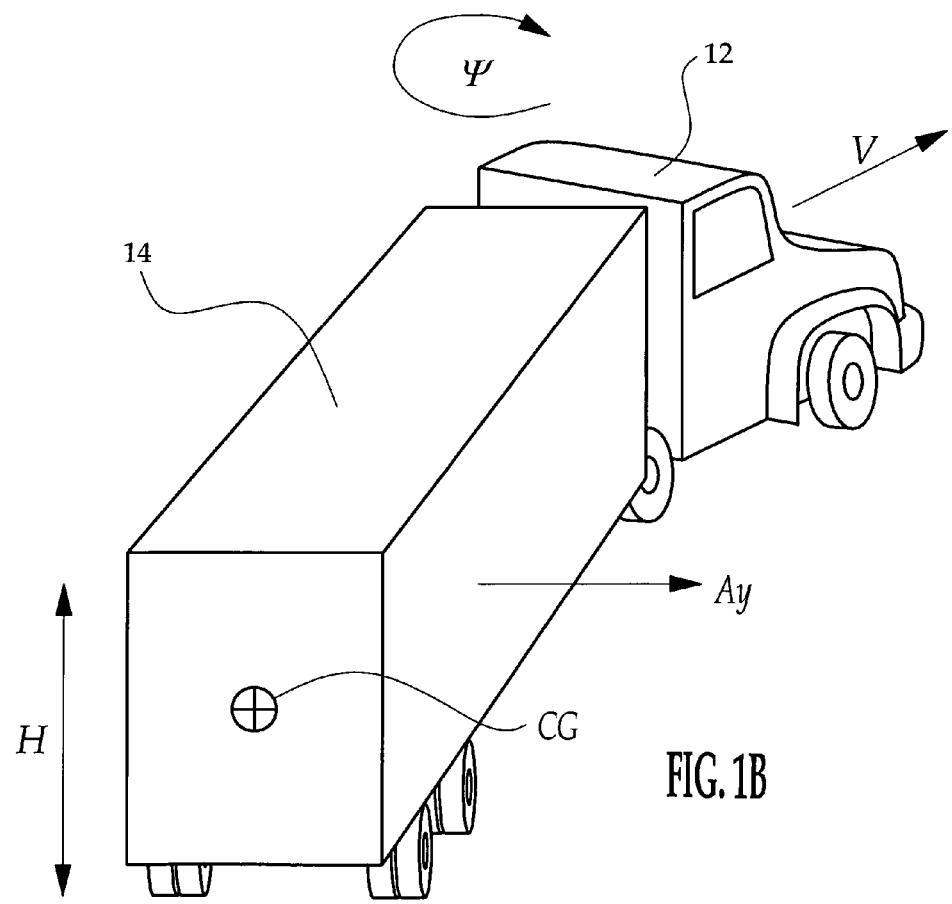
FIG. 1B is an isometric representation of the heavy duty truck of FIG. 1A.

Referring to FIGS. 1A-1B, the reference numeral 10 generally designates a semi tractor-trailer including a tractor 12 and a trailer 14 connected to the tractor 12 by a conventional fifth-wheel coupling (not shown). Of course, the invention also applies to other types of transport vehicles such as straight trucks, box trucks, vans, etc., and even to aerospace vehicles, for example. In general, transport vehicles such as the truck 10 are subject to wide variation in loading. The weight and distribution of the cargo load both influence the CG height of the truck, and therefore, its rollover propensity. Lateral and longitudinal variations in the CG can also influence the vehicle's rollover propensity, but the primary variation of interest is the CG height. The CG of the trailer 14 is identified in FIG. 1B, and its height above the road surface is given by the letter H. The lateral acceleration Ay experienced by the trailer 14 acts through the CG, creating a moment or torque that produces tilt or roll of the truck 10. This torque is directly proportional to the CG height, and the CG also shifts laterally once the trailer 14 starts to tilt, further increasing the likelihood of rollover. Other factors represented in FIG. 1B that influence rollover include the vehicle speed V and its yaw rate Ψ. In the case of truck 10, the lateral acceleration Ay applies primarily to the trailer 14, while the speed V and yaw rate Ψ apply primarily to the tractor 12. In other vehicle configurations where no trailer is involved, these distinctions do not apply.

Referring to FIG. 1A, the rollover warning and detection method of this invention is implemented with a low-g lateral acceleration sensor 18, a vehicle speed sensor 20, a yaw rate sensor 22, a microprocessor-based controller 24 and a rollover warning device 26. The lateral acceleration sensor 18 is situated on the longitudinal axis 16a of the trailer 14, on a surface such as the loading bed. The yaw rate sensor 22 measures yaw rate about a vertical axis, and is situated on the longitudinal axis 16b of the tractor 12. The speed sensor 20 may be a wheel or shaft speed sensor as is well known in the art. The controller 24 samples and processes the signals produced by the sensors 18, 20 and 22, and activates the warning device 26 via line 28 in the event of an impending rollover event. The warning produced by device 26 may be audible or visual, and in a preferred implementation, additionally includes a wireless transmission to notify a home office or authorities that a rollover or near-rollover has occurred. Interventional controls such as braking, steering or engine controls may also be included.

Figure 2:
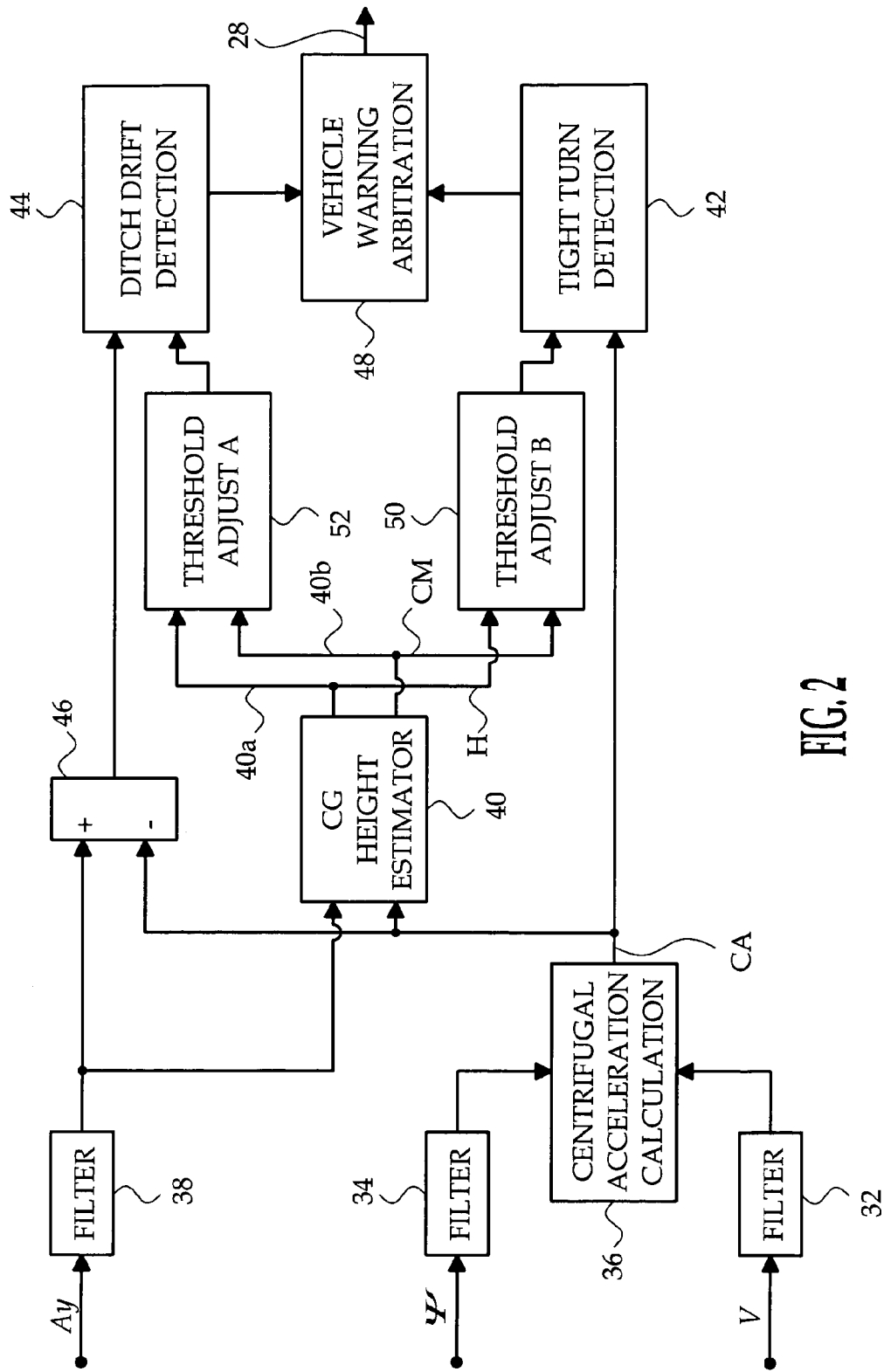
FIG. 2 is a block diagram depicting a rollover warning method carried out with the sensors and controller of FIG. 1A according to this invention.

The block diagram of FIG. 2 describes the functionality of the controller 24 of FIG. 1A. The vehicle speed and yaw rate inputs V and Ψ are filtered by the low-pass filter blocks 32 and 34, and applied to block 36 which calculates a corresponding centrifugal acceleration CA according to the product (V*Ψ). Alternatively, the yaw rate input may be replaced with a steering rate input, such as a time-derivative of steering wheel angle. The lateral acceleration input Ay is similarly filtered by the low-pass filter block 38, and the filtered lateral acceleration is applied to the CG Height Estimator block 40 along with the calculated centrifugal acceleration CA. The operation of CG Height Estimator block 40 is described below in reference to FIGS. 4-5, and it is sufficient at this point to note that the block 40 outputs two parameters: a CG height estimate H on line 40a, and an estimation confidence metric CM on line 40b.

The embodiment of FIG. 2 includes a first rollover detection block 42 for detecting impending rollover due to tight turns and a second rollover detection block 44 for detecting impending rollover due to a ditch drift condition where the truck 10 drifts off a roadway toward a ditch or embankment. Of course, different or additional rollover detection blocks could be included if desired. In general, the detection blocks 42 and 44 each involve comparing a measured, calculated or estimated parameter to a calibrated threshold that represents a predetermined likelihood or risk of rollover. In the case of tight-turn rollover detection (block 42), the calculated centrifugal acceleration CA is compared to a calibrated threshold. In the case of ditch drift rollover detection (block 44), an estimate of the trailer roll angle or tilt is compared to a calibrated threshold. In the illustrated embodiment, the block 46 estimates the trailer roll angle as a function of the difference (CA−Ay). The computed centrifugal acceleration CA is the lateral acceleration the trailer 14 should experience in the absence of tilting, whereas the lateral acceleration Ay measured by sensor 18 is augmented by gravitational acceleration when the trailer 14 is experiencing tilt or roll. The block 48 combines the outputs of rollover detection blocks 42 and 44, and determines if rollover warning device 26 should be activated, and at what level. As indicated above, the possible levels of rollover warning could include audible warnings, visual warnings, or even a wireless transmission to notify a home office or authorities that a rollover or near-rollover has occurred.

The method of the present invention utilizes the outputs of block 40 to adaptively adjust the rollover detection logic for variations in the CG height of truck 10. In the illustrated embodiment, this is achieved by blocks 50 and 52, which adjust the calibrated thresholds used by the rollover detection blocks 42 and 44, respectively. An alternate but equivalent approach would be to similarly adjust the vehicle parameter input—that is, the calculated centrifugal acceleration CA in the case of rollover detection block 42, and the trailer roll angle estimate in the case of rollover detection block 44.

Figures 3, 5:
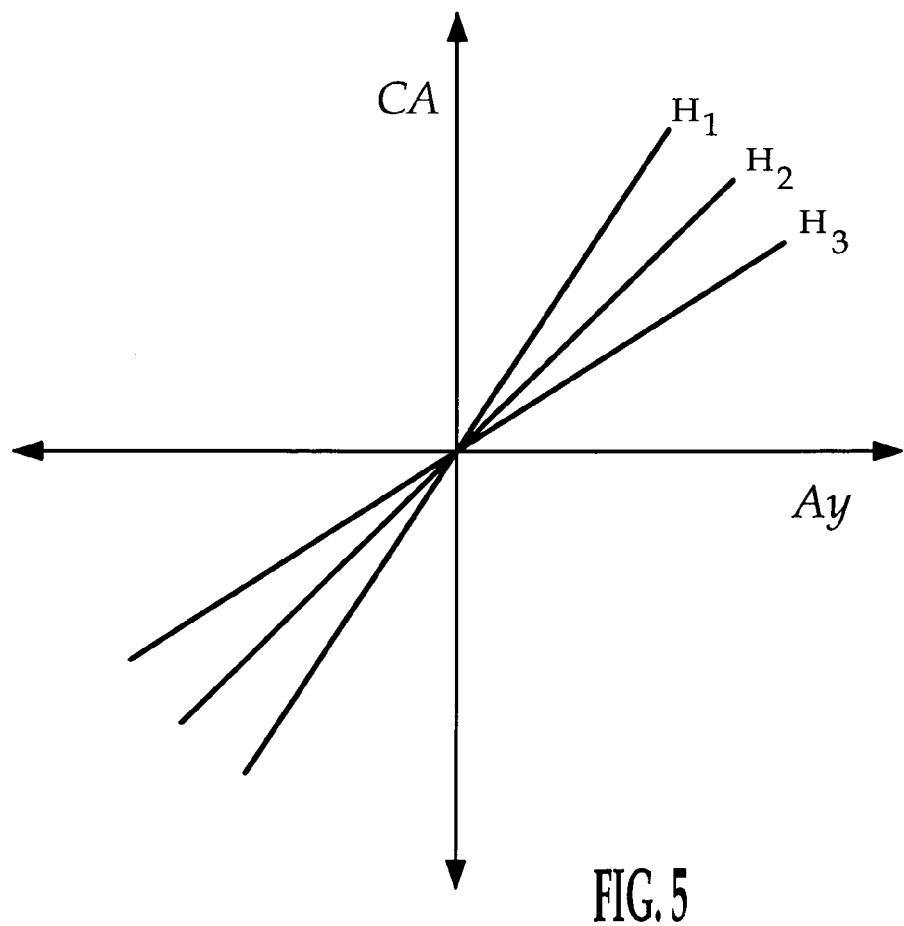
FIG. 3 is a diagram describing a portion of the block diagram of FIG. 2 pertaining to rollover detection threshold adjustment.
FIG. 5 depicts a set of baseline traces describing centrifugal acceleration vs. lateral acceleration for the truck of FIGS. 1A-1B for CG heights $H_1$, $H_2$, $H_3$.

The diagram of FIG. 3 describes a technique for carrying out the functionality of threshold adjustment blocks 50 and 52 using a look-up table. The rollover detection blocks 42 and 44 include calibrated default thresholds as mentioned above, and the blocks 50 and 52 develop adjustments for the respective default thresholds based on the CG height and confidence outputs H, CM of block 40. FIG. 3 depicts a look-up table in which H and CM are the independent variables and the threshold adjustment is the dependent variable. The zero values in the table indicate no threshold adjustment, and occur when the CG height H is approximately equal to a predetermined or typical height and/or the confidence metric CM is low. The positive values in the table increase the default threshold to reduce the likelihood of rollover detection, and occur with lower than usual CG height H. The negative values in the table decrease the default threshold to increase the likelihood of rollover detection, and occur with higher than usual CG height H. In cases where the CG height H is outside the usual or typical range, the magnitude of the adjustment increases with increasing values of the confidence metric CM. Of course, the values shown in the table are for illustration only, and it will be recognized that the mathematical calculations could be used instead of a look-up table.

Figure 4:
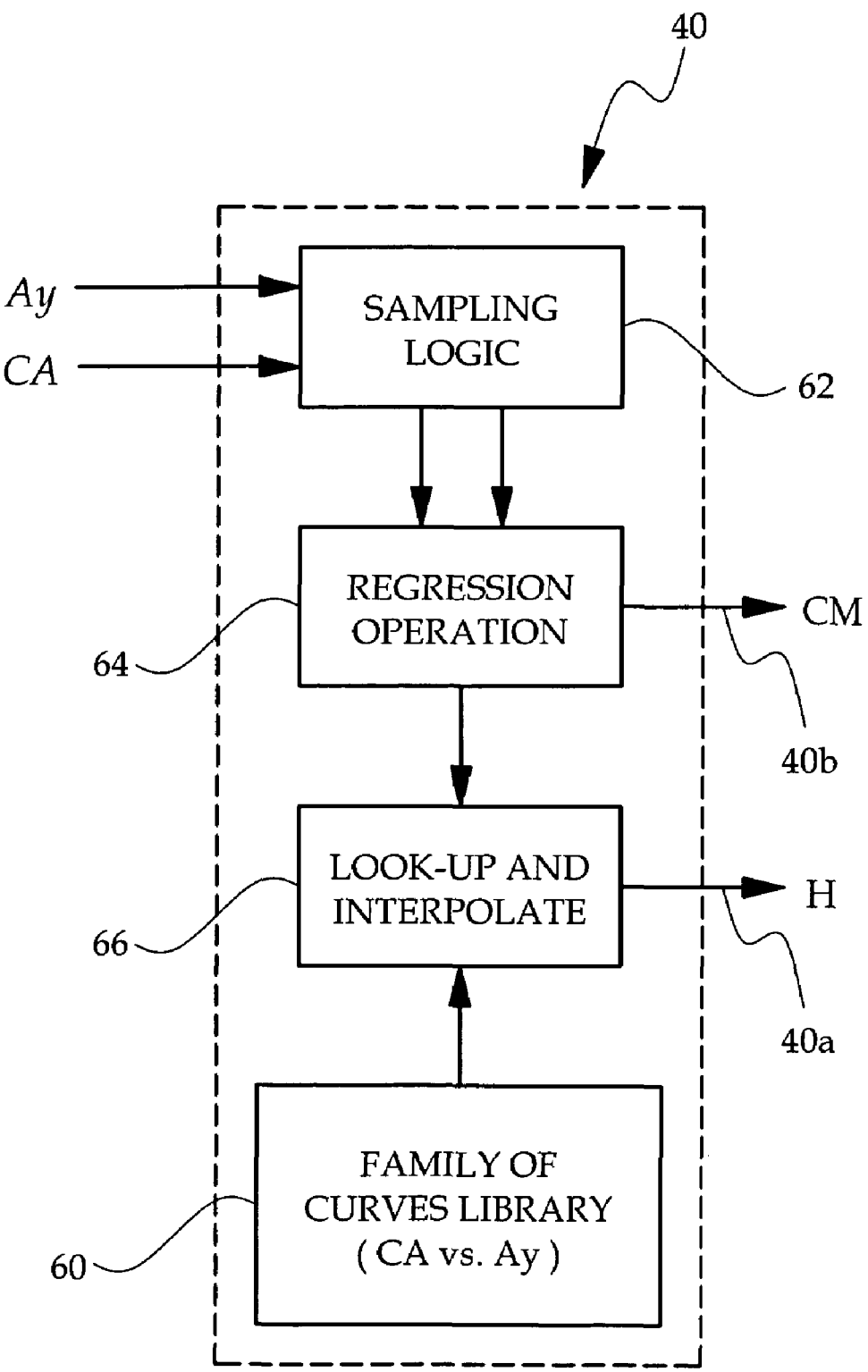
FIG. 4 is a block diagram detailing of portion of the block diagram of FIG. 2 pertaining to CG height estimation.

As indicated above, CG height H is estimated according to this invention based on the calculated centrifugal acceleration CA and the measured lateral acceleration Ay. These parameters are related to the CG height because the centrifugal acceleration CA acts through the CG to produce tilting of the trailer 14, and the tilting causes Ay to become larger than CA. However, since direct calculation of CG height is not feasible due to variability in vehicle operation, road condition and other factors, the block 40 estimates the CG height H by collecting CA vs. Ay data and comparing the collected data with previously established baseline data. As illustrated in FIG. 5, the baseline data can take the form of a family of CA vs. Ay curves for various payloads having increasing values $H_1$, $H_2$, $H_3$ of CG height. A linear or non-linear regression function is applied to the baseline data to produce the curves, and the curves are stored in the memory of controller 24, represented in FIG. 4 by the block 60. In subsequent vehicle operation, block 40 periodically collects CA vs. Ay data and determines CG height H by comparing the collected data to the stored family of baseline curves. Referring to FIG. 4, the block 62 samples the measured lateral acceleration Ay for different values of centrifugal acceleration CA representing driving conditions under various speed and turning conditions of the truck 10. The data can be represented as a scatter-plot, and when a representative amount of data has been collected, the block 64 applies a least-squares regression fit to the scatter-plot to produce a curve (linear or non-linear) that is comparable with the stored family of baseline curves. The block 64 determines the shape of the curve, and produces a measure of how well the data conforms to the curve using a R-squared, variance or standard deviation calculation, for example. This "goodness-of-fit" measure is referred to herein as the confidence metric CM, which is used in the threshold adjustment of blocks 50 and 52 as described above. In general, the confidence metric CM will have a relatively high value if the sampled CA vs. Ay data conforms well to the curve and a relatively low value if the sampled data conforms poorly to the curve. The block 66 compares the CA vs. Ay curve produced by block 64 to the family of baseline curves stored at block 60, and determines a corresponding CG height H by interpolation.

In summary, the present invention provides a rollover warning and detection method for a transport vehicle that automatically adapts to changing load conditions that influence the CG height of the vehicle. While the invention has been described with respect to the illustrated embodiment, it is recognized that numerous modifications and variations in addition to those mentioned herein will occur to those skilled in the art. For example, the system can be configured for direct entry of the CG height if known, data obtained from a global positioning satellite (GPS) system could be used to determine vehicle parameters such as speed, heading and roadway curvature, and so on. Accordingly, it is intended that the invention not be limited to the disclosed embodiment, but that it have the full scope permitted by the language of the following claims.

The invention claimed is:

1. A rollover detection method for a transport vehicle, comprising the steps of:
    establishing baseline relationships between centrifugal acceleration and measured lateral acceleration for different CG heights of said vehicle;
    determining a centrifugal acceleration acting on said vehicle;
    measuring a lateral acceleration of said vehicle;
    determining a CG height of said vehicle based on the determined centrifugal acceleration, the measured lateral acceleration, and the baseline relationships;
    detecting an impending rollover event based on comparison of a rollover-related parameter to a calibrated threshold; and
    adapting the detection of said impending rollover event to account for vehicle loading conditions when the determined CG height is higher or lower than a predetermined height.

2. The method of claim 1, where the detection of said impending rollover event is adapted to increase a likelihood of rollover detection when the estimated CG height is higher than the predetermined height.

3. The method of claim 2, including the step of:
 decreasing said calibrated threshold to increase the likelihood of rollover detection.

4. The method of claim 1, where the detection of said impending rollover event is adapted to decrease a likelihood of rollover detection when the estimated CG height is lower than the predetermined height.

5. The method of claim 4, including the step of:
 increasing said calibrated threshold to decrease the likelihood of rollover detection.

6. The method of claim 1, including the steps of:
 measuring a yaw or steering rate of said vehicle;
 measuring a speed of said vehicle; and
 determining said centrifugal acceleration based on the measured yaw or steering rate and the measured speed.

7. The method of claim 6, where said vehicle includes a tractor coupled to a trailer, the method including the steps of:
 measuring said yaw rate with respect to a longitudinal axis of said tractor; and
 measuring said lateral acceleration with respect to a longitudinal axis of said trailer.

8. The method of claim 1, including the steps of:
 determining a confidence metric based on a conformance of said current relationship to a predetermined curve; and
 adapting the detection of said impending rollover event based on the estimated CG height and the confidence metric.

9. The method of claim 1, including the step of:
 activating a warning on detection of said impending rollover event; and
 transmitting a notification of said warning to a remote location.

* * * * *